US010021181B2

(12) United States Patent
Endahl et al.

(10) Patent No.: US 10,021,181 B2
(45) Date of Patent: Jul. 10, 2018

(54) SYSTEM AND METHOD FOR DISCOVERING A LAN SYNCHRONIZATION CANDIDATE FOR A SYNCHRONIZED CONTENT MANAGEMENT SYSTEM

(71) Applicant: Dropbox, Inc., San Francisco, CA (US)

(72) Inventors: Jesse Endahl, Oakland, CA (US); Sujay Jayakar, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 419 days.

(21) Appl. No.: 14/579,872

(22) Filed: Dec. 22, 2014

(65) Prior Publication Data

US 2016/0182626 A1 Jun. 23, 2016

(51) Int. Cl.
*G06F 15/16* (2006.01)
*H04L 29/08* (2006.01)
(Continued)

(52) U.S. Cl.
CPC .... *H04L 67/1095* (2013.01); *G06F 17/30174* (2013.01); *H04L 67/1063* (2013.01); *H04L 67/42* (2013.01)

(58) Field of Classification Search
CPC ... H04L 67/1095; H04L 47/10; H04L 67/104; H04L 67/1063; G06F 17/30206;
(Continued)

(56) References Cited

U.S. PATENT DOCUMENTS 5,978,813 A * 11/1999 Foltz ................. G06F 17/30067
7,870,272 B2 1/2011 Berkowitz et al.
(Continued)

FOREIGN PATENT DOCUMENTS

WO 03/005244 A2 1/2003

OTHER PUBLICATIONS

PCT Search Report and Written Opinion dated Feb. 25, 2016, in related Application No. PCT/US2015/061951, filed Nov. 20, 2015, entitled, "System and Method for Discovering a LAN Synchronization Candidate for a Synchronized Content Management System", Applicant Dropbox, Inc., 19 pages.
(Continued)

*Primary Examiner* — Vivek Srivastava
*Assistant Examiner* — Muhammad Raza
(74) *Attorney, Agent, or Firm* — Polsinelli PC

(57) ABSTRACT

Systems, methods, and computer-readable storage media for identifying a LAN sync candidate are disclosed. A synchronized content management system may receive a request from a first client device to synchronize a content item. The synchronized content management system may identify a second client device that has a current copy of the content item. The second client device may belong in the same local area network as the first client device. The second client device can be identified based on a characteristic of the LAN as well as the public and local addresses of the first and second client devices. The synchronized content management system can send a LAN sync instruction to the first client device. The instruction may identify the second client device as a LAN sync candidate. The first client device may then initiate LAN sync by requesting synchronization of the content item from the second client device.

20 Claims, 9 Drawing Sheets

(51) Int. Cl.
   *H04L 29/06* (2006.01)
   *G06F 17/30* (2006.01)
(58) Field of Classification Search
   CPC ......... G06F 17/30174; G06F 17/30079; G06F 17/30091; G06F 17/30212
   See application file for complete search history.

(56) References Cited

U.S. PATENT DOCUMENTS

| | | | | |
|---|---|---|---|---|
| 8,019,900 B1* | 9/2011 | Sekar | ................ | H04L 67/1095 709/217 |
| 8,069,232 B2 | 11/2011 | Silverman et al. | | |
| 8,838,836 B1* | 9/2014 | Li | ................ | H04L 67/104 709/204 |
| 8,904,041 B1* | 12/2014 | Poutievski | ............ | H04L 61/103 709/245 |
| 9,317,384 B2* | 4/2016 | Cen | ................ | H04L 29/08729 |
| 9,742,842 B2* | 8/2017 | Roberts | ............ | H04L 29/08306 |
| 2008/0201428 A1* | 8/2008 | Dubnicki | ........ | G06F 17/30067 709/205 |
| 2009/0106355 A1* | 4/2009 | Harrow | ................ | H04L 47/10 709/203 |
| 2009/0319473 A1* | 12/2009 | Rao | ................ | G06F 17/3048 |
| 2010/0005180 A1* | 1/2010 | Tyukasz | ................ | H04L 63/029 709/228 |
| 2010/0138555 A1* | 6/2010 | Gerber | ................ | H04L 12/66 709/232 |
| 2010/0225811 A1 | 9/2010 | Konvisser | | |
| 2010/0299308 A1 | 11/2010 | Prasad et al. | | |
| 2010/0299444 A1 | 11/2010 | Nilo et al. | | |
| 2010/0299553 A1* | 11/2010 | Cen | ................ | H04L 29/08729 714/4.1 |
| 2011/0296013 A1* | 12/2011 | Saunders | ............. | H04L 67/10 709/224 |
| 2013/0103785 A1* | 4/2013 | Lyon | ................ | H04N 21/2385 709/217 |
| 2013/0103834 A1* | 4/2013 | Dzerve | ................ | H04L 67/10 709/225 |
| 2013/0191445 A1 | 7/2013 | Gayman et al. | | |
| 2013/0226876 A1* | 8/2013 | Gati | ................ | G06F 17/30079 707/652 |
| 2014/0025727 A1* | 1/2014 | Ahn | ................ | H04L 67/1095 709/203 |
| 2015/0066850 A1* | 3/2015 | Oliver | ............... | G06F 11/1464 707/620 |
| 2015/0334182 A1* | 11/2015 | Wu | ................ | H04L 67/1095 707/620 |
| 2016/0119413 A1* | 4/2016 | Antipa | ............. | H04L 67/104 709/204 |

OTHER PUBLICATIONS

Elson, Jeremy, "Fine-Grained Network Time Synchronization using Reference Broadcasts", Department of Computer Science, University of California, Los Angeles, May 17, 2002, pp. 1-14.

* cited by examiner

| MY_SHARED_DOC.TXT | | | |
|---|---|---|---|
| PUBLIC IP | LOCAL IP | SUBNET MASK | LAST MODIFIED |
| 99.123.10.29 | 10.10.0.2 | 255.255.0.0 | APR 16, 2012 11:14:09 |
| 197.9.9.8 | 192.168.1.103 | 255.255.0.0 | APR 21, 2012 08:26:14 |
| 99.123.10.29 | 10.11.1.2 | 255.255.255.0 | APR 19, 2012 14:41:58 |
| 99.123.10.29 | 10.10.0.3 | 255.255.0.0 | APR 21, 2012 08:26:14 |
| 82.6.201.4 | 172.18.3.10 | 255.240.0.0 | APR 16, 2012 11:14:09 |
| 99.123.10.29 | 10.11.2.3 | 255.255.255.0 | APR 21, 2012 08:26:14 |
| 197.9.9.8 | 10.11.2.100 | 255.255.255.0 | Apr 20, 2012 17:47:21 |

FIG. 3

SYSTEM AND METHOD FOR DISCOVERING A LAN SYNCHRONIZATION CANDIDATE FOR A SYNCHRONIZED CONTENT MANAGEMENT SYSTEM

TECHNICAL FIELD

The present technology pertains to synchronized content management systems, and more specifically pertains to synchronizing content between client devices in the same local area network.

BACKGROUND

An online synchronized content management system, such as Dropbox® from Dropbox Inc. of San Francisco, Calif., allows its users to store and synchronize data on a cloud-based storage and across multiple client devices. Thus, for example, a user may upload a personal folder to the content management system, and then share the folder on multiple user devices by making duplicate copies of the folder on each of the devices. The instances of the shared folder, though may be residing on different devices, can be kept synchronized. In other words, through the process of synchronization, the contents of the shared folder on multiple client devices can be kept identical. Even the slightest modification made by the user to one of the instances of the folder can automatically be replicated in other instances of the folder in a matter of seconds.

However, data synchronization across multiple client devices has traditionally been handled by a central server such as the content management system. More specifically, a change in content of a shared folder on one client device would be first replicated in the instance of the folder stored in the central content management system. The central server would then synchronize the shared folder with every other client device. Although this method of data synchronization may be relatively straightforward and intuitive to implement, it has several drawbacks.

First, too much burden may be placed on the central distributor. In other words, since every single client device must rely on the content management system to perform the task of data distribution, the content management system must bear the brunt of the workload. As such, the content management may become overburdened to handle an excessive amount of data processing and an overwhelming amount of data transfers. Second, the stability and robustness of the system can be compromised. Since every data synchronization job needs to go through the central distributor, the entire system can be paralyzed if the central distributor suddenly becomes unavailable. Third, connecting to and communicating with the central distributor can be costly. Client devices often need to connect to the central server via a wide area network (WAN) such as the Internet. Wide area networks can be, in general, less reliable and of inferior performance than a local area network (LAN).

Accordingly, some content management systems, such as Dropbox®, allow their client devices or peers to synchronize with each other, especially over a LAN. Synchronizing data over a LAN connection (also called a "LAN sync") may confer several benefits over synchronizing through a central distributor. Due to the relatively smaller geographical area that a typical LAN occupies, a LAN generally offers better performance and reliability than a WAN. A LAN, in general, can also be more configurable and customizable. Moreover, communicating over a LAN may be more cost-effective because there is no need to pay additional bandwidth or subscription fees for Internet communication.

However, in order for a client device to synchronize with another client device over a LAN, the client device needs to know which other client devices may be available for communication on the local network and which shared files or folders may be available for synchronization on each of those client devices. In other words, clients may want to find other clients on the same local network that contain the same files or folders. One way to obtain such information is for each client device to broadcast messages out to the local network to solicit information about other client devices' file-sharing availability. Sometimes each client device on the local network may voluntarily announce its shared files and folders by broadcasting a list of shared files and folders, thereby allowing other clients on the network to assemble a full list of available files and folders in the local network.

Sending broadcast messages out to the local network, however, can quickly flood the pipeline. This problem can be further compounded when the number of content items to be synchronized and/or the number of client devices sending out broadcast messages is large, because the amount of generated traffic can become noisy and may even overwhelm the network. Moreover, it cannot be guaranteed that a broadcast message would indeed reach every other host residing in the local network. For instance, if the network is subdivided into one or more subnetworks which map to specific departments or buildings, the broadcast message might not be able to travel beyond the relevant subnet boundary. Other impediments such as an internal firewall can further limit the broadcast message's reach. In other cases, the local network administrator or the network policy may prevent the local network nodes from sending out a massive amount of unsolicited broadcast messages. Broadcasting information about the shared files or folders may also raise security and privacy concerns.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for identifying a synchronization candidate with a local area network. After a synchronized content management system emits a signal that indicates availability of a more current version of a content item for synchronization, the synchronized content management system may receive a request from a client device to synchronize the content item. The synchronized content management system may then identify another client device, in the same local area network as the requesting client device, that has the current version of the content item. This other client device can be the LAN sync candidate for the requesting client device. The LAN sync candidate may be identified based on the public IP addresses as well as the local addresses associated with the requesting client and the LAN sync candidate client. Other information such as the network characteristic, subnet information, etc. may be used to find the candidate. If more than one sync candidate is found in the LAN, the synchronized content management system can determine which candidate has the best reachability and/or synchronization performance.

After the synchronized content management system sends to the requesting client an instruction that identifies the LAN sync candidate, the client can initiate LAN sync by contacting the LAN sync candidate and requesting synchronization. If the LAN sync is not successful because the sync candidate cannot be reached, the synchronized content management system may suggest the next best sync candidate to the requesting client, whereby the client may continue to attempt the LAN sync process. The clients may report to the synchronized content management system their local IP addresses and other information related to the local network, while the synchronized content management system may monitor its clients for any change in their public IP addresses.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 shows an exemplary mapping for copies of a content item stored in client devices;

DESCRIPTION

Figure 1:
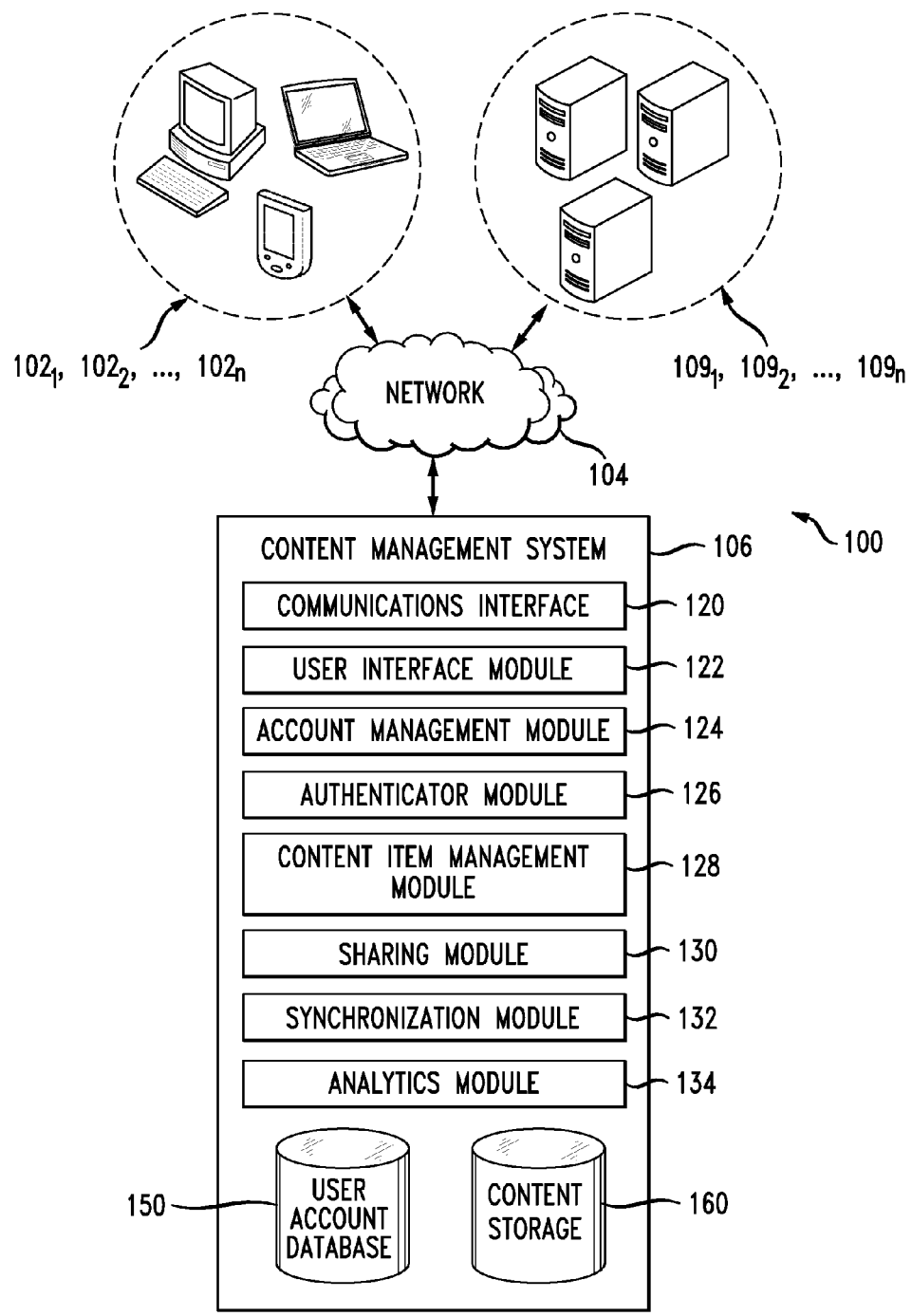
FIG. 1 shows an exemplary configuration of devices and a network in accordance with the invention.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for performing a LAN sync among client devices without the need to flood the LAN with broadcast messages. As used herein, the term "public address" may refer to a globally routable unicast address. The public address can be an IP address. Data packets originating from a node on the Internet can be routed to a public address. In contrast, the term "local address" (also referred to as "private address" or "internal address") may mean an IP address in a private IP address space, and it may be used in a local area network. The private IP address can be one of the three private IP address spaces as outlined in RFC 1918, namely 10.0.0.0/8, 172.16.0.0/12, and 192.168.0.0/16. Local addresses are typically not globally routable, which is to say that a packet originating from outside the local network typically cannot be routed to the local address inside the local network. A router, however, may map one or more local addresses to a public address through the process of network address translation (NAT) such that a node having a local address in a LAN can send packets to anywhere on the Internet and vice versa. As such, a network node in a LAN can have both a public IP address and a local IP address. Network nodes residing on the same LAN behind a router can share the same public IP address.

As used herein, the term "synchronization" or simply "sync" may refer to the process of harmonizing the difference among two or more copies of a content item, such as a file, a folder, a document, audio content, video content, etc., that are stored in two or more devices. The devices can be a server, such as a synchronized content management system server, or a client device. The harmonizing the difference can be done by copying and replacing one copy with another copy, creating a new copy, removing an old copy, etc. For example, two devices, each containing a copy of a file, may be configured to synchronize the file between each other. If one of the copies of the file is modified on one device and the other copy remains unchanged, performing a sync between the two devices may result in the newly modified version of the file being copied over from one device and replacing the unmodified file in the other device, such that both devices can have the identical and current copies of the file. In another example, if a new file is created in one of the devices, the same file can be created in another synchronized client device to replicate the file creation. By the same token, if a copy of the file is deleted in one device, then the deletion can be replicated in other synchronized devices as well. Synchronization is typically performed to preserve the most recently created or modified (i.e., "current") version of a file being synced, and the older versions of the file may be discarded. However, the server and/or client devices can also be configured to preserve the previous versions of a synced content item for a limited or extended period of time.

With respect to implementing various embodiments of the disclosed technology, an exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device 102, may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1$, $109_2$, . . . , $109_n$ (collectively "109") via an Application Programming Interface (API). Communications interface 120 can be primarily responsible for identifying public and local IP addresses of various client devices. Communications interface 120 or other modules may help maintain a database, for example stored in user account database 150, content storage 160, or other storage areas within content management system 106, that stores all the public and local IP addresses associated with various client devices. The addresses can be mapped to each instance of content items such that content management system 106 can look up which other client devices within a given local area network have the latest version of a given content item. Based on these mappings, content management system 106 can make recommendations as to which client device to perform a LAN sync with.

Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
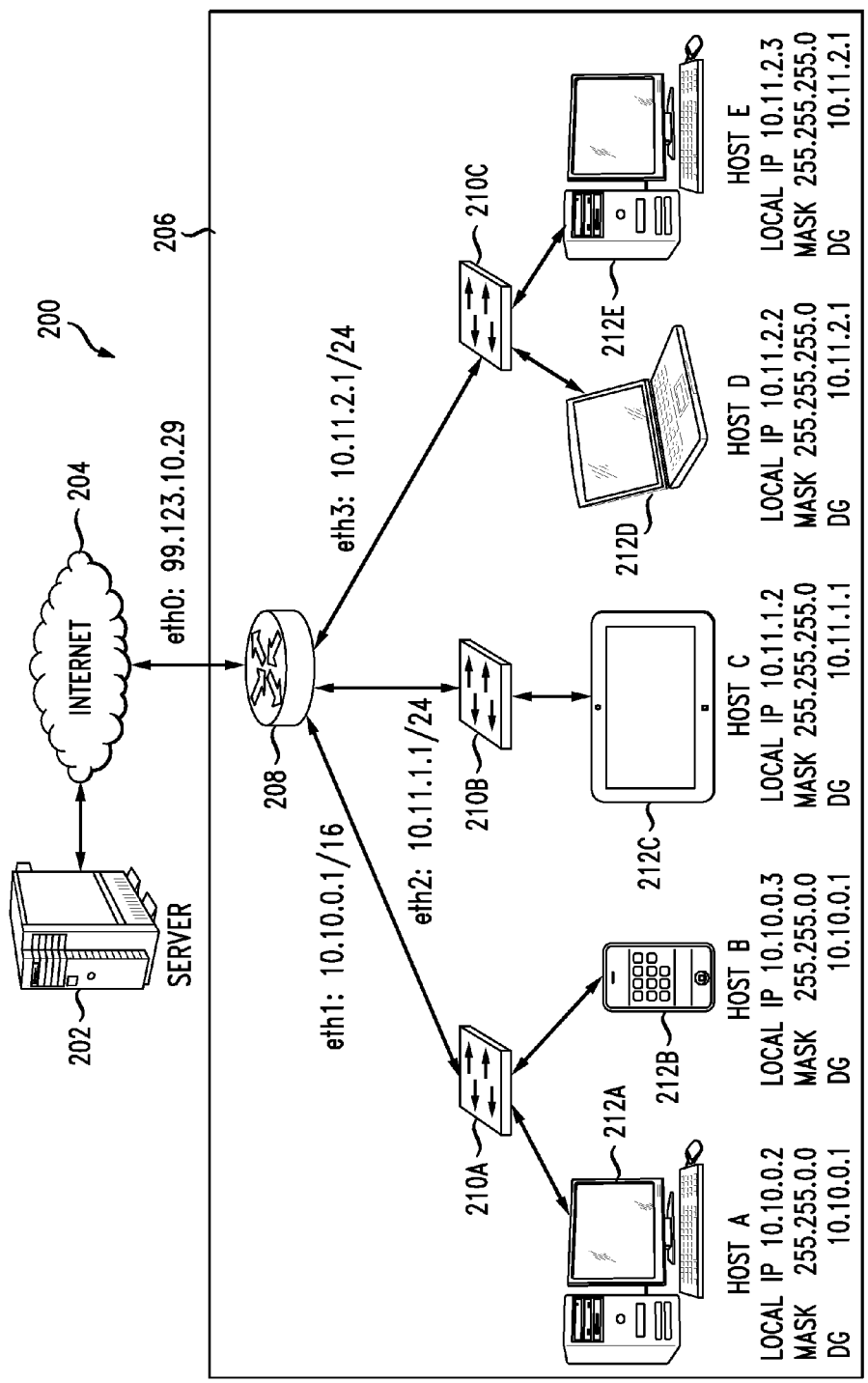
FIG. 2 shows another exemplary configuration of devices and a network in accordance with the invention.

FIG. 2 shows another exemplary configuration of devices and a network in accordance with the invention. This exemplary system 200 may consist of one or more servers 202 hosting a synchronized content management system, such as content management system 106 of FIG. 1. Various client devices, such as Host A 212A, Host B 212B, Host C 212C, Host D 212D, and Host E 212E (collectively "212"), can connect to server 202 through the Internet 204 to synchronize various user content data. Client devices 212 (also known as "peers") can be any computing device that is capable of storing data and communicating with server 202. For example, each of client devices 212 may be a computer, a desktop computer, a laptop computer, a personal digital assistant (PDA), a mobile device, a cellular telephone, a smartphone, a tablet computer, a wearable computer, a smart appliance, a smart vehicle, etc. The synchronization can be performed by client application software (also known as "desktop client") that is installed on each of client devices 212. For example, the client application that runs on Host A 212A can synchronize content data such as files, folders, documents, images, audio, video, etc. that are stored in Host A 212A with server 202 such that server 202 can keep copies of the content data. Such data may be synchronized across more than one client device belonging to the same user account or a different user account. For example, a content item stored in Host A 212A and synchronized with server 202 can also be synchronized with Host B 212B, Host C 212C, and Host E 212E. However, depending on their syncing schedule, network availability, etc., not all client devices may have the most current (i.e., most recently updated) version of the content item.

Client devices 212 may belong in the same local area network (LAN) 206. Although FIG. 2 shows all client devices 202 as belonging to LAN 206, one of skill in the art will understand that there can be other client devices located outside LAN 206. Clients 212 in LAN 206 may connect to an external network, such as the Internet 204, through gateway 208. Gateway 208 can be a router, which can remap one IP address space to another through the process of network address translation (NAT). In other words, gateway 208 can create one or more local address spaces for LAN 206. In this example, router 208 has created a local address space in the private network range of 10.0.0.0/8. Router 208 can also divide LAN 206 into three subnets having network prefixes 10.10.0.0/16, 10.11.1.0/24, and 10.11.2.0/24. As such, gateway 208 can have multiple network interfaces having been assigned multiple local IP addresses—10.10.0.1, 10.11.1.1, and 10.11.2.1—each corresponding to one of the three subnets. In addition, gateway 208 may also have a public IP assigned to one of its network adapters (e.g., 99.123.10.29).

Switches 210A, 210B, 210C may each belong to one of the three subnets and allow host devices 212 to connect to the subnets. In this example, Host A 212A and Host B 212B have internal IP addresses of 10.10.0.2 and 10.10.0.2, respectively, and belong to the 10.10.0.0/16 subnet. Accordingly, their subnet mask is 255.255.0.0 and the default gateway is 10.10.0.1. Similarly, Host C 212C has a local IP address 10.11.1.2 with a subnet mask 255.255.255.0, and its default gateway is 10.11.1.1. Host D 212D and Host E 212E are assigned local IP addresses of 10.11.2.2 and 10.11.2.3, respectively. Their subnet mask is 255.255.255.0 and their default gateway is 10.11.2.1.

One or more host devices 212 may have client applications installed on them that can communicate with server 202 to keep their content data, such as files, folders, documents, etc., synchronized with server 202 or any other client devices 212. Client devices 212 may be associated with the same user account or different user accounts that may be sharing one or more content items amongst each other. Typically, a client device may synchronize its content items to and from server 202. However, when a content item being synchronized on one client device is also available on another client device belonging in the same local area network, that content item can be synchronized through the process of LAN synchronization, whereby the content item may be synchronized with that other client device instead of server 202. LAN sync can dramatically speed up the syncing process because traffic may be exchanged much faster with another device inside LAN 206 than with server 202 through the Internet 204. Typically when a content item is added or modified on a client device, the client application will initiate the syncing process as soon as it determines that a change has been made to the content item. The client application may upload the modified content item to server 202, and all other linked devices that are configured to synchronize the content item (i.e., client devices associated with the same user account or different user account(s) sharing the content item) may then download the new version of the content item from server 202. With LAN sync, however, server 202 can examine the local area network to identify any other client devices that may already have a recent copy of the content item, thereby bypassing the need to download the content item from server 202.

FIG. 3 shows an exemplary mapping for copies of a content item stored in client devices. Such mapping table 300 may be stored in a synchronized content management system, such as content management system 106 as shown in FIG. 1 or server 202 as shown in FIG. 2. Exemplary mapping information 300 shown in FIG. 3 is for one exemplary content item MY_SHARED_DOC.TXT. However, one of skill in the art will recognize that similar mapping information can be stored in server 202 for other content items such as files, folders, documents, data, audio, video, etc. Mapping table 300 can be stored in a storage area, such as user account database 150 and/or content storage 160 as shown in FIG. 1 or other similar database. Mapping table 300 may also contain information about user accounts and/or access rights (not shown) associated with MY_SHARED_DOC.TXT.

According to exemplary mapping table 300, six client devices are identified as storing copies of MY_SHARED_DOC.TXT. For example, table entry 302 shows that a client host with the public IP address of 99.123.10.29 and the local IP address of 10.10.0.2 is currently storing a copy of MY_SHARED_DOC.TXT that was last modified on Apr. 16, 2012, 11:14:09. The "LAST MODIFIED" field in table 300 indicates the last modified data and time of the copy of the content item. Server 202 may, therefore, infer whether a particular copy stored in a client device is the most recent (i.e., current) copy of the item or not. Alternatively or in conjunction with the "LAST MODIFIED" field, table 300 can have a "VERSION" field (not shown) that indicates the version number of each copy. For example, table 300 can indicate that the version of the file stored in client device 302 is v1.0 while the version of the file stored in another client device 308 may be v1.2, which indicates that the client device 308 has the more current version of the file.

The synchronized content management system may collect mapping information 300 by monitoring individual client applications and/or receiving reports from the those client applications. For example, the public addresses can be obtained when the content management system communicates with the client devices by examining the headers of the IP packets exchanged. Whenever the content management system recognizes a change in a client's public IP address, the content management system can record the new public address in content item database 300. Local IP address can be reported by the client apps running on individual client devices. Since a client app has access to the client device's communication components such as a network adapter, the client app can gather information about the client's communication environment including the LAN configuration and report the information back to the synchronized content management system. The information can include the local address, subnet mask, default gateway, location, topology, and other network characteristics. The client can report to the content management system periodically or anytime it detects a change in the configuration. For example, when a client's local IP address changes, it can report the change to the content management system so that the content management system can update mapping database 300. Similarly, the client can report to the synchronized content management system of the list of all the content items that it is storing and any metadata that is associated with the content items. The metadata may include such information as dates and times of creation, modification, access, etc. Alternatively, the synchronized content management may be able to simply extract the metadata from the copies of content items.

When a sync request for a content item is received from a client device, the synchronized content management system can make a prediction as to which other client devices may belong in the same local area network as the requesting client by cross-referencing the public IP addresses of the clients storing the content item with their local IP addresses. For example, by referencing table 300, the synchronized content management system may conclude that the client devices corresponding to table entries 302, 306, 308, 312 are likely to be in the same LAN because they share the public IP address of 99.123.10.29. Likewise, the system may also make an assumption that client devices 304 and 314 belong in the same LAN because they share the same public IP address of 197.9.9.8. On the other hand, the content management system may conclude that client 312 and client 314 are unlikely to be in the same LAN despite having similar local IP addresses (i.e., 10.11.2.3 and 10.11.2.100, respectively) because they have different public addresses (i.e., 99.123.10.29 and 197.9.9.8, respectively). Other information, such as subnet masks, default gateways, network topology, device locations, etc., may also be used to make inferences as to which client devices might be in the same local area network. Thus, before attempting to synchronize the content item with the client, the content management system server can send back to the client an instruction that identifies a candidate client device that may be contacted for a LAN sync. The requesting client can use the information provided by the server to perform a LAN sync with another client without having to send out broadcast messages to find the other client. The requesting client can also potentially reach more clients in the LAN by using the LAN sync instructions from the server because broadcast messages often cannot get past the subnet to which the client belongs. The client can also use the broadcast messages in conjunction with the server's LAN sync instructions to identify a LAN sync candidate.

However, even if two devices are located in the same LAN, they may not be able to communicate with each other because of, for example, an internal firewall. Thus, when the synchronized content management system identifies a multiple potential candidates having the current copies of the content item, the system can attempt to determine the best LAN sync candidate for the client device requesting synchronization by ranking the other identified client devices in the LAN in terms of reachability. One way to rank the clients may be to analyze the adjacency of the local IP addresses. By inspecting the number of differing bits between the two IP addresses, the devices' proximity can be estimated. For example, empirically, a device with the internal IP address of 192.168.1.1 may be more reachable from a device with the internal IP address of 192.168.1.2 than from a device with the internal IP address of 192.168.1.250. Similarly, when the number of differing bits is the same, internal addresses with the different bit(s) in the lower-order bits may be more reachable from each other than the addresses with the different bit(s) in the higher-order bits. For example, 192.168.1.1 may be more reachable from 192.168.1.2 than from 192.168.2.1.

Thus, according to exemplary mapping table 300, when a sync request is received from client device 302 (public IP 99.123.10.29, local IP 10.10.0.2), the synchronized content manager may identify client device 308 (public IP 99.123.10.29, local IP 10.10.0.3) and client device 312 (public IP 99.123.10.29, local IP 10.11.2.3) as potential LAN sync candidates because they share the same public IP address as client device 302 and they have the most recently modified (Apr. 21, 2012, 08:26:14) copies of MY_SHARED_DOC.TXT. However, the synchronized content management system may conclude that client device 308 might be a better LAN sync candidate than client device 312 because client 308 has a "closer" internal IP address to the internal address of client 302 than client 312 does. Subnet masks, default gateways, and other information may also help determine client reachability within the LAN. For example, clients belonging in the same subnet may be more reachable than client belonging in different subnets, and clients that share the same default gateway may be more reachable from each other than the ones that do not.

Client reachability may also be reported by the client devices themselves. After receiving a LAN sync instruction from the server, each client device can attempt a LAN sync with the identified sync candidate within the LAN, and report the results back to the server. Such report may include information such as the time of LAN sync attempt, LAN sync result (i.e., success or failure), connection speed, etc. Consequently, the server can receive the report and record the information (not shown) in database 300. The server can reference the data to make a more informed decision later when recommending a LAN sync candidate. For example, if client 302 has reported earlier that it could not reach client 308 for a LAN sync, the server can then suggest the next best candidate, such as client 306, for another LAN sync attempt. Likewise, if client 302 has reported earlier of a successful LAN sync with client 308, then when yet another client device having a local address belonging in the same subnet as client 302 and client 308 (i.e., 10.10.0.0/16) requests synchronization, the server can suggest to the new client to do a LAN sync with client 302 or client 308. The synchronized content management system can employ various methods of known machine learning techniques to make intelligent predictions based on the reachability information provided by the client devices.

The synchronized content management system can recommend to a client device a list of sync candidates in the descending order of reachability and/or connection speed. Thus, the content management system can recommend that the requesting client device perform synchronization with a peer in the same subnet first, a peer in the same LAN but not in the same subnet second, a peer outside the LAN (over the WAN) third, and finally with the content management system server itself. The list of sync candidates can be transmitted to the requesting client one at a time per request, or the entire list of candidates can be given out to the client at once.

Having disclosed some basic system components and concepts, the disclosure now turns to the example method embodiments shown in FIGS. 4-7. For the sake of clarity, the method is described in terms of system 800, as shown in FIG. 8A and to be discussed later, configured to practice the method. Alternatively, however, the method may also be practiced by system 850 as shown in FIG. 8B or system 200, consisting of one or more servers 202 and one or more client devices 212, as shown in FIG. 2. The steps outlined herein are exemplary and can be implemented in any combination thereof in any order, including combinations that exclude, add, or modify certain steps.

Figure 4:
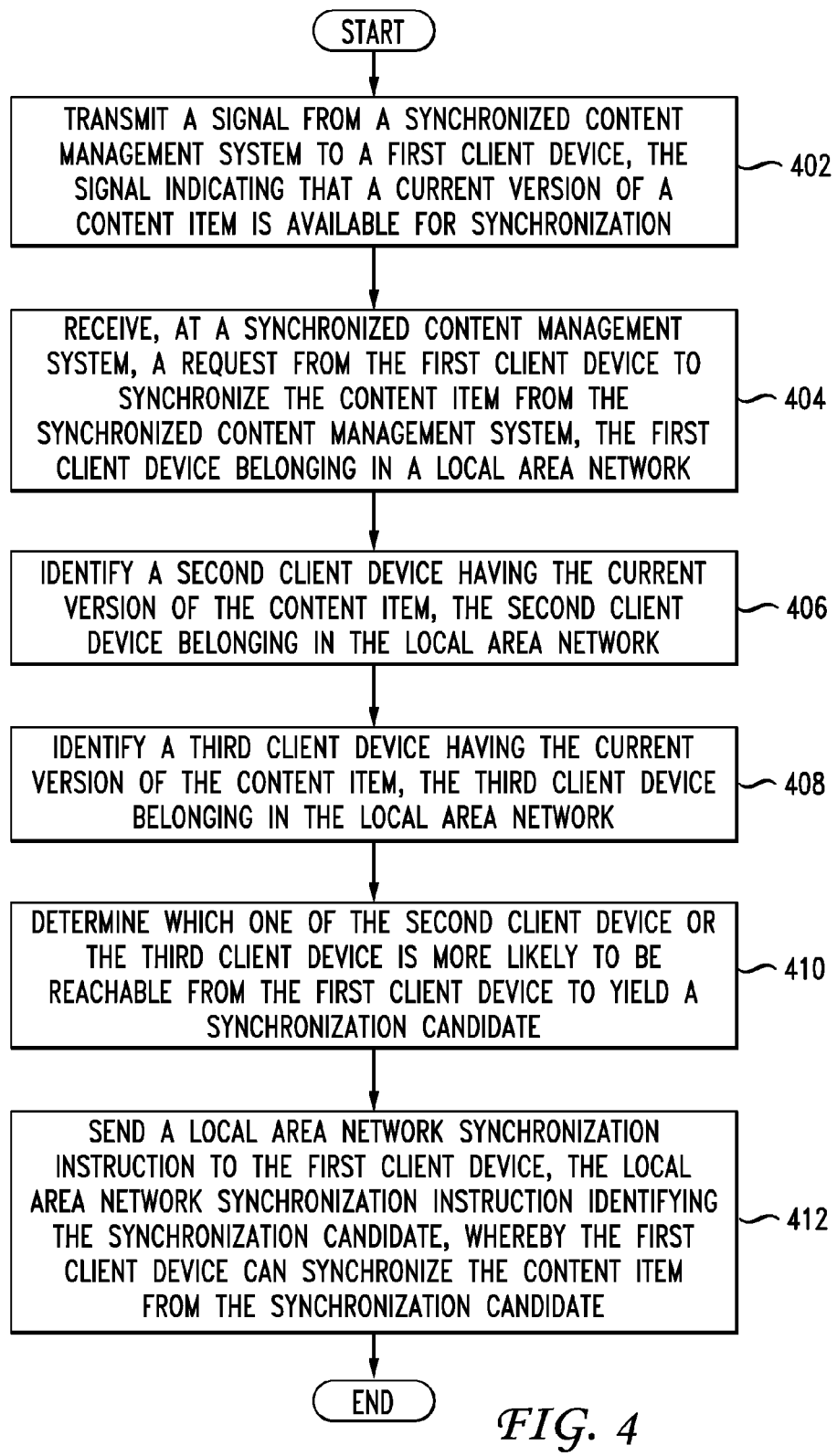
FIG. 4 shows an exemplary method embodiment for sending a LAN sync instruction to a client device.

FIG. 4 shows an exemplary method embodiment for sending a LAN sync instruction to a client device. System 800 may first transmit a signal from a synchronized content management system to a first client device, the signal indicating that a current version of a content item is available for synchronization (402). The signal can be a notification. The synchronized content management system may consist of one or more servers, and the content item may be stored on the synchronized content management system in a user account associated with the first client device. The current version of the content item may have been created and/or modified by a client device other than the first client device and uploaded to the synchronized content management system. The signal can be "pushed" out to the first client device as soon as the current version of the content item becomes available for synchronization. That is, transmission of the signal can be initiated by the server. Alternatively, the signal can be "pulled" or its transmission can be initiated by the first client by periodically polling the server. The signal can be sent via a "long poll" method, whereby the first client establishes a continuous communication channel with the server and the server may transmit the signal by briefly closing the channel.

In response to the signal, system 800 may receive, at the synchronized content management system, a request from the first client device to synchronize the content item from the synchronized content management system, the first client device belonging in (i.e., connected to) a local area network (404). The first client device may have first address information such as a characteristic of the local area network, a public address of the client device, or a local address of the client device. In response to the request, the synchronized content management system can synchronize the content item with the first client device by transmitting the current copy of the content item stored in the synchronized content management system to the first client device. However, instead, system 800 can identify a second client device having the current version of the content item, the second client device belonging in the local area network (406). The identification of the second client device may be done based on the first address information. The identification may be also based on second address information of the second client device. The second client device can be associated with the same user account as the user account associated with the first client device. Alternatively, the first client device and the second client device can be associated with different user accounts, but those user accounts may have been configured to share the content item between each other. The second client device can be identified based on a characteristic of the local area network, the first client device's public address, the first client device's local address, the second client device's public address, and/or the second client device's local address. The public and local addresses may be IP addresses. The local addresses can be IP addresses in a private network range that follows RFC 1918 standards. In addition, the characteristic of the LAN can be its network topology, a subnet mask associated with a subnetwork of the local area network, a default gateway, locations of the network hosts, etc. The second client device may also be identified by comparing the first address information of the first client device and the second address information of the second client device, and thereby identifying a client device that may share the identical public address as the first client device but have a distinct local address from the first client device. For example, if the first client device and the second client device both have the public IP address of 99.123.10.29, but they have different local IP addresses (e.g., 10.10.1.1 and 10.10.1.2, respectively), then system 800 may make an assumption that the second client address belongs in the same LAN as the first client device.

System 800 may also identify a third client device, if there is one, having the current version of the content item, the third client device belonging in the local area network (408). The third client device can be identified by much the same way as the second client device as discussed above. System 800 can also identify additional client devices, if there are any, in the same LAN that may have the current version of the content item. If system 800 happens to identify other client devices that are in the same LAN but do not have the current copy of the content item, system 800 at that point may send signals to those client devices to indicate that the current version of the content item is available for synchronization, thereby allowing those client devices to also initiate their own syncing processes. Once two or more client devices in the LAN are identified as having the current version of the content item, system 800 can determine which one of those client devices (i.e., which one of the second client device, the third client, etc.) is more likely to be reachable from the first client device (410). The more reachable client device becomes the synchronization candidate (i.e., LAN sync candidate) to be recommended to the first client. The determination can be based on whether the second client device or the third client device belongs in the same subnetwork (within the local area network) as the first client device. In other words, whichever client device that might belong in the same subnet as the first client device can be a preferred choice for the synchronization candidate. The determination can be further based on one or more subnet masks or subnet routing prefixes associated with the first client device, the second client device, and/or the third client device. The determination can also be based on how many bits of a local address that the second client device or the third client device shares with the first client device. Higher-order bits of the local address can be given priority or preference than the lower-order bits.

System 800 may then send a local area network synchronization instruction to the first client device, the local area network synchronization instruction identifying the synchronization candidate, whereby the first client device can synchronize the content item from the synchronization candidate (412). The sync candidate can be the first client device, the second client device, or the third client device. In some aspects, the LAN sync instruction can contain more than one sync candidate, optionally identified in the order of preference (e.g., reachability). In other aspects, the LAN sync instruction may contain only the best sync candidate, and more candidates can be identified with further instructions. In addition to synchronizing the content item from the second client device as suggested by the server, the first client device may be configured to synchronize the content item also from the synchronized content management system. Moreover, the first client device can be configured to perform LAN sync with more than one client device at the same time. Furthermore, the first client device can be configured to synchronize with the content management system after it fails to sync with its peer(s).

Figure 5:
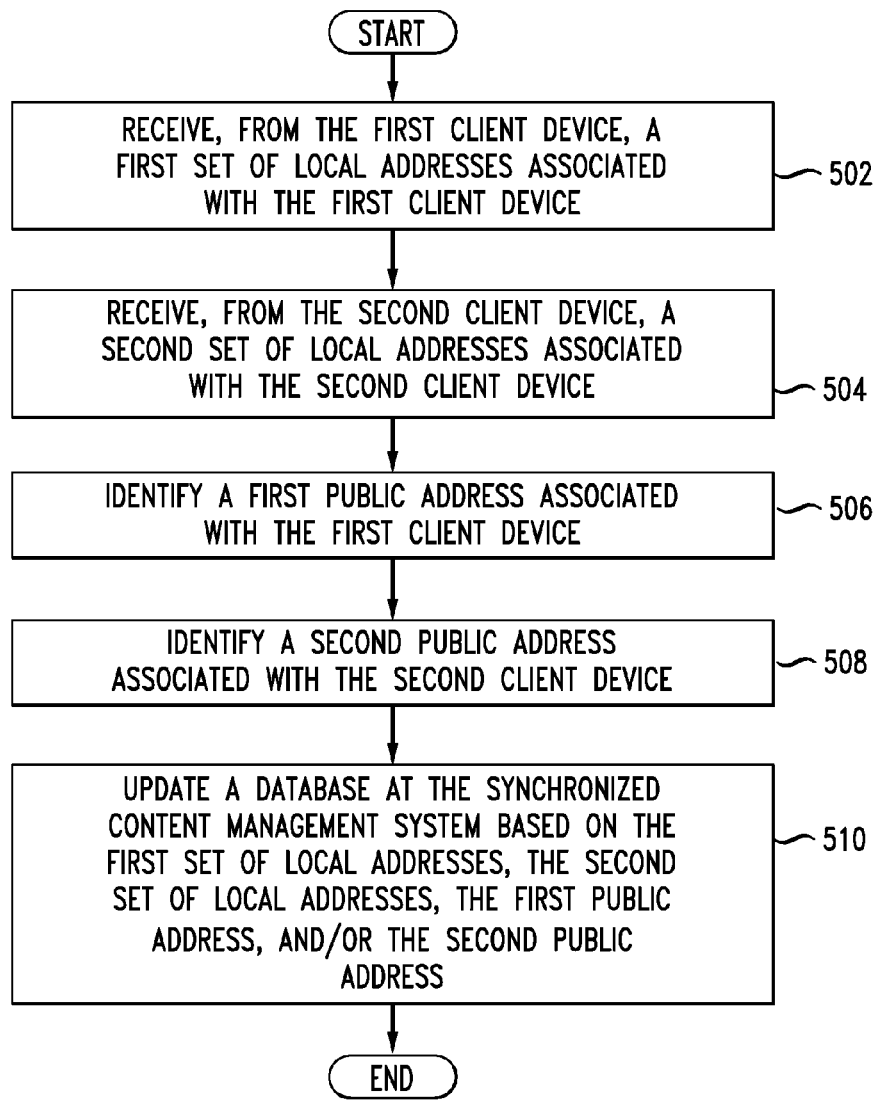
FIG. 5 shows an exemplary method embodiment for monitoring public and local IP addresses for a client device.

FIG. 5 shows an exemplary method embodiment for monitoring public and local IP addresses for a client device. System 800 may receive, from the first client device, a first set of local addresses associated with the first client device (502). System 800 may also receive, from the second client device, a second set of local addresses associated with the second client device (504). In addition, system 800 may identify a first public address associated with the first client device (506), and identify a second public address associated with the second client device (508). As discussed above, these steps may occur in any order. For example, system 800 may receive the local addresses from the second client device and then from the first client device, etc. Additionally, these steps can occur before, after, or contemporaneously with the steps shown in FIG. 4. Thus, system 800 can, for example, receive local addresses from the first and second client devices before or after system 800 receives the sync request from the first client device. Once one or more addresses have been received or identified, system 800 can update a database at the synchronized content management system based on the first set of local addresses, the second set of local addresses, the first public address, and/or the second public address (510). The database can be updated whenever one of the tracked addresses changes. Other relevant information, such as subnet masks, default gateways, subnet routing prefixes, host locations, network topology, etc. may also be recorded in the database. System 800 may also receive and/or identify addresses and update the information in the database for other client devices, such as the second client device and the third client device, as well. Based on the information recorded in the database, system 800 may attempt to make educated guesses and assumptions related to the reachability from one client device to another in the same local area network. In order to accomplish this task, system 800 can also make predictions as to the topology of the LAN. In other words, system 800 can analyze the provided information to create an estimated network topology and subnet hierarchy.

Figure 6:
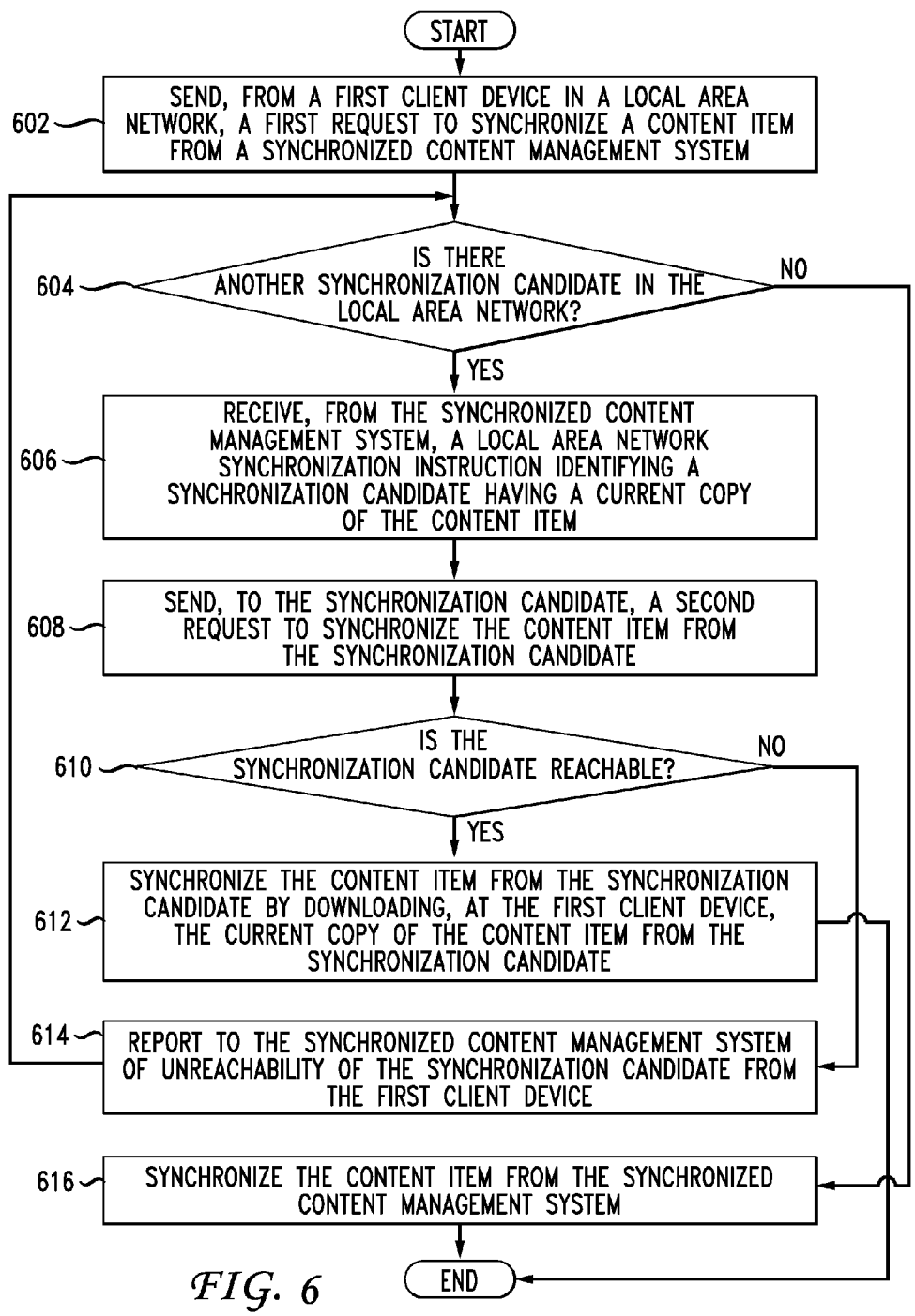
FIG. 6 shows an exemplary method embodiment for performing a LAN sync.

FIG. 6 shows an exemplary method embodiment for performing a LAN sync. First, system 800 can send, from a first client device in a local area network, a first request to synchronize a content item from a synchronized content management system (602). Upon receiving the request, system 800 can determine whether there can be found a synchronization candidate in the local area network (604). If there is a LAN sync candidate, then system 800 may receive, from the synchronized content management system, a local area network synchronization instruction identifying a synchronization candidate having a current copy of the content item (606). If there are multiple candidates, the instruction can identify the best candidate in terms of reachability and/or performance. If no sync candidate can be found, however, system 800 may synchronize the content item from the synchronized content management system (616).

In addition to receiving the LAN sync instruction from the synchronized content management system, the first client may also broadcast one or more messages out to the local area network to identify the synchronization candidate having the current copy of the content item. Once the synchronization candidate is identified, whether though broadcasting or through the instruction from the server, system 800 can initiate the LAN sync process by sending to the synchronization candidate a second request to synchronize the content item from the synchronization candidate (608). If the synchronization candidate is reachable from the first client device (610), then system 800 may synchronize the content item from the synchronization candidate by downloading, at the first client device, the current copy of the content item from the synchronization candidate (612). The first client device's syncing process may conclude at this point. However, if the first client device fails to reach the synchronization candidate, for example because of an internal firewall in the LAN, etc., the first client device can report to the synchronized content management system of unreachability of the synchronization candidate (614). At this point, the flow may proceed to step 604 and system 800 can determine, once again, whether there are any other synchronization candidates left in the LAN.

In some aspects, once the first client device successfully performs a LAN sync with the synchronization candidate, the synchronization candidate can be configured to act as if it were a content management server to the first client device. In other words, the synchronization candidate can deliver the sync availability signal to the first client device via a push, pull, or long-poll method when the synchronization candidate has the more current version of the content item than the first client device. The first client device can then send sync request directly to the synchronization candidate and initiate the LAN sync process without having to communicate with other devices outside the local network.

Figure 7:
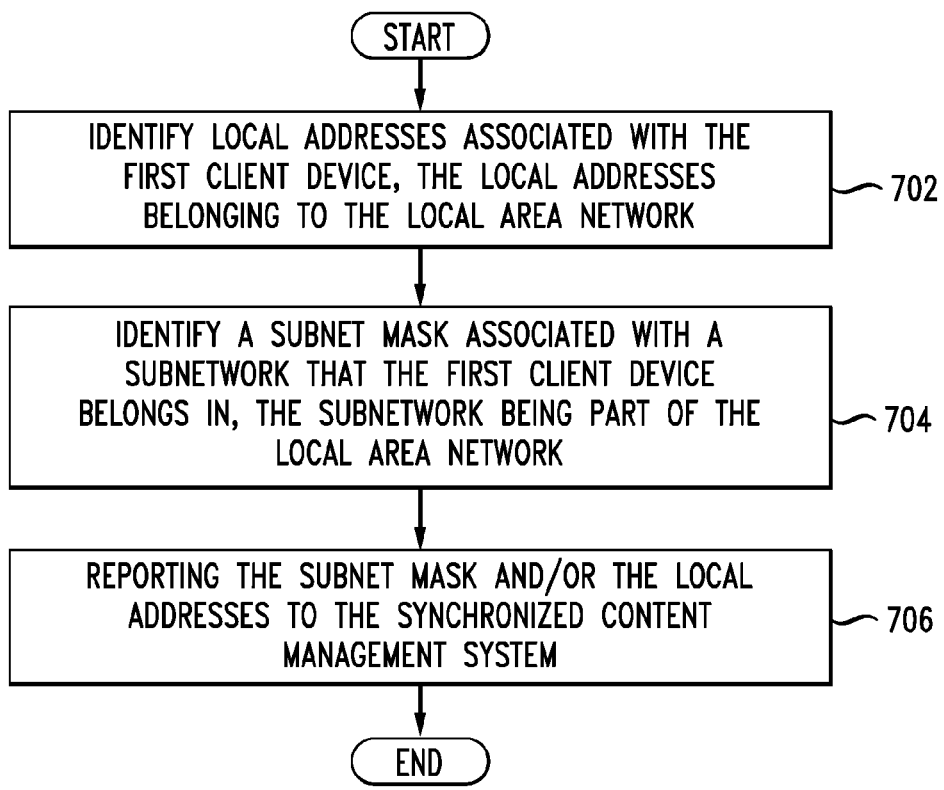
FIG. 7 shows an exemplary method embodiment for reporting client network information to the synchronized content management system.
Figure 8A:
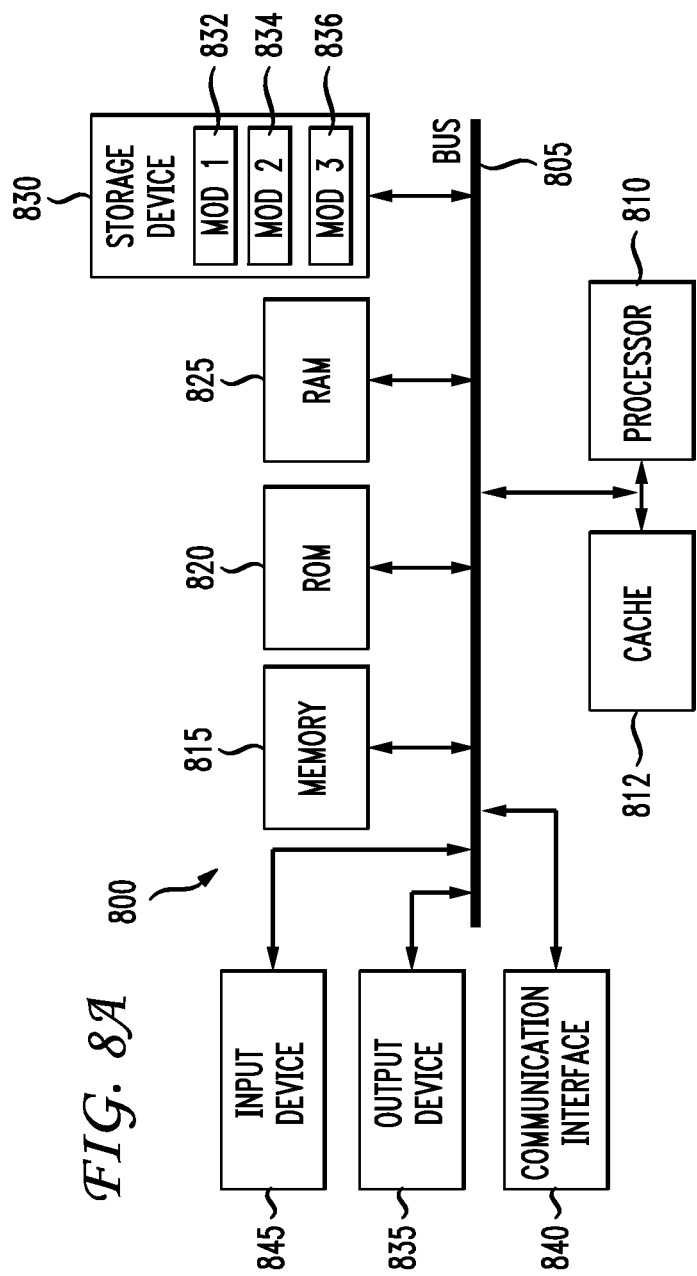
FIG. 8A shows an exemplary possible system embodiment for implementing various embodiments of the present technology.
Figure 8B:
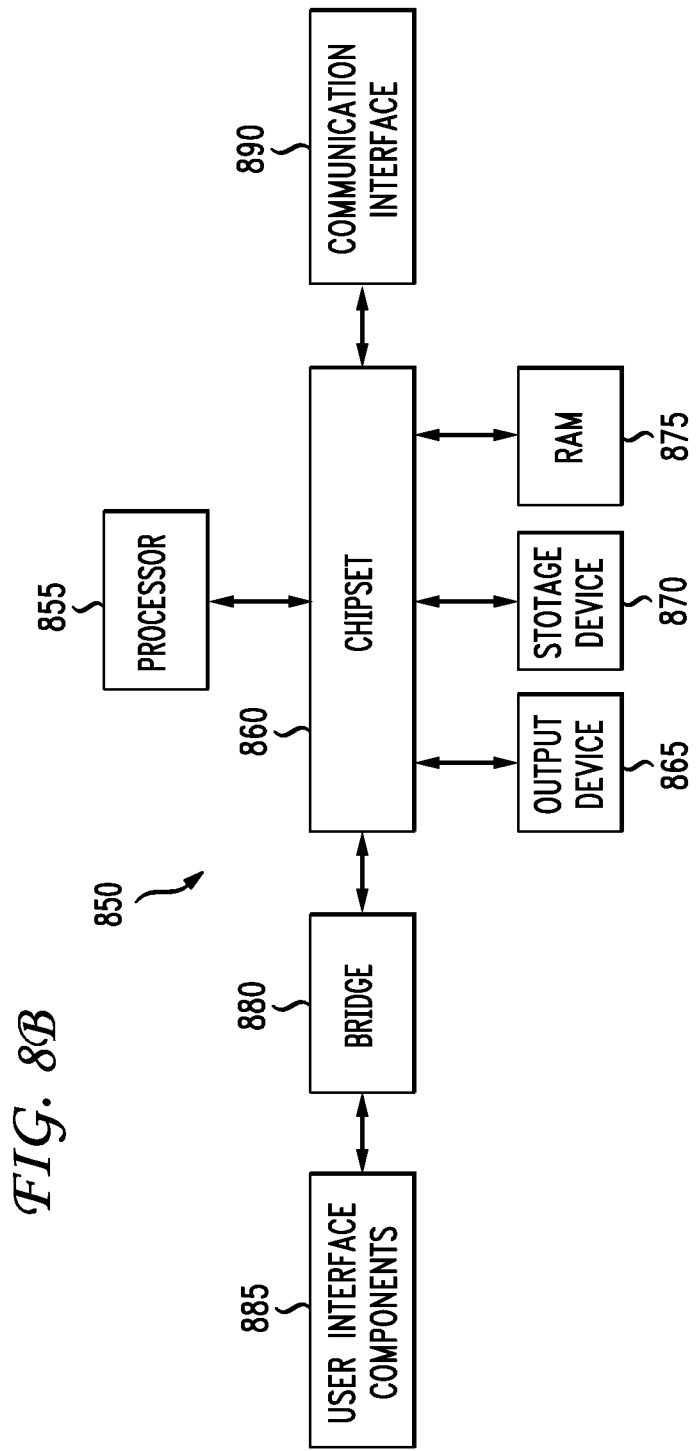
FIG. 8B shows an exemplary possible system embodiment for implementing various embodiments of the present technology.

FIG. 7 shows an exemplary method embodiment for reporting client network information to the synchronized content management system. The first client device can monitor its own network information and periodically or dynamically send to the content management server reports detailing the changed network information. As such, system 800 can identify one or more local addresses associated with the first client device, the local addresses belonging to the local area network (702) The first client device may accomplish this task by issuing a command, such as ipconfig, ifconfig, etc., to list all the IP addresses associated with the device, and then filtering the output for any addresses that may fall in the internal range (i.e., private network range following the standards set by RFC 1918, such as 10.0.0.0/8, 172.16.0.0/12, and 192.168.0.0/16).

The first client may also identify a subnetwork that the first client device may belong to, the subnetwork being part of the local area network (704). The subnet can be identified by using information such as the subnet mask, default gateway, etc. The first client may then report the local addresses and/or the subnet to the synchronized content management system (706). The first client device can be configured to make the report only when there is a change. For example, when the network information, such as the local addresses or the subnet, is identified, the first client device can compare the information against the previously gathered information to determine whether there has been a change. If there is no change, the first client device may simply skip the report.

FIG. 8A and FIG. 8B show exemplary possible system embodiments. The more appropriate embodiment will be apparent to those of ordinary skill in the art when practicing the present technology. Persons of ordinary skill in the art will also readily appreciate that other system embodiments are possible. FIG. 8A illustrates a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

What is claimed is:

1. A method comprising:
    receiving, at a server of a synchronized content management system, from a client application on a first client device including a synchronized content management system application that receives user input for the synchronized content management system, first mapping information collected from the first client device by the client application and a request from the client application on the first client device to synchronize a content item stored on the first client device, the first client device connected to a local area network and having first address information;
    receiving, at the server of the synchronized content management system, from a client application on a second client device including the synchronized content management system application that receives user input for the synchronized content management system, second mapping information collected from the second client device by the client application and an indication identified by a background process run by the synchronized content management system application of a current version of the content item stored at the client application on the second client device and the second client device having second address information;
    identifying, by the synchronized content management system via the indication, the second client device as having the current version of the content item, and based on the first address information and the first mapping information collected from the first client device and the second address information and the second mapping information collected from the second client device, that the second client device is connected to the local area network;
    identifying a third client device having the current version of the content item, the third client device connected to the local area network and having third address information;
    determining which one of the second client device or the third client device is more likely to be reachable from the first client device based on the second address information, the third address information, and a subnet mask associated with at least one of the first client device, the second client device, or the third client device to yield a synchronization candidate; and
    sending a local area network synchronization instruction to the first client device, the local area network synchronization instruction identifying the synchronization candidate, whereby the first client device can synchronize the content item from the synchronization candidate.

2. The method of claim 1, further comprising:
    prior to receiving the request, sending a notification from the synchronized content management system to the first client device, the notification indicating that the current version of the content item is available for synchronization.

3. The method of claim 1, wherein the content item is stored on the synchronized content management system in a user account associated with the first client device.

4. The method of claim 1, wherein address information associated with a client device includes at least one of a characteristic of the local area network, a public address of the client device, or a local address of the client device.

5. The method of claim 4, wherein at least one of the public address or the local address is an Internet protocol (IP) address.

6. The method of claim 5, wherein the local address is in a private network range that follows RFC 1918 standards.

7. The method of claim 4, wherein the characteristic is one of a network topology or a subnet mask associated with a subnetwork of the local area network.

8. The method of claim 1, wherein identifying the second client device comprises:
   comparing the first address information and the second address information to identify a client device that shares an identical public address as the first client device but has a distinct local address from the first client device.

9. The method of claim 1, wherein the first client device is configured to synchronize the content item from the synchronized content management system when synchronizing the content item from the second client device fails.

10. The method of claim 1, further comprising:
    receiving, from the first client device, the first address information including a first set of one or more local addresses associated with the first client device;
    receiving, from the second client device, the second address information including a second set of one or more local addresses associated with the second client device;
    identifying a first public address associated with the first client device;
    identifying a second public address associated with the second client device; and
    updating a database at the synchronized content management system based on at least one of the first set of one or more local addresses, the second set of one or more local addresses, the first public address, or the second public address.

11. The method of claim 1, wherein the determining is based on whether one of the second client device or the third client device belongs in a same subnetwork, within the local area network, as the first client device.

12. The method of claim 1, wherein the determining is based on how many high-order bits of a local address that one of the second client device or the third client device shares with the first client device.

13. A system comprising:
    a processor; and
    a non-transitory computer-readable storage medium comprising instructions stored thereon, which, when executed by the processor, cause the processor to:
    receive, at a server of a synchronized content management system, from a client application on a first client device including a synchronized content management system application that receives user input for the synchronized content management system, first mapping information collected from the first client device by the client application and a request from the client application on the first client device to synchronize a content item stored on the first client device, the first client device connected to a local area network and having first address information;
    receive, at the server of the synchronized content management system, from a client application on a second client device including the synchronized content management system application that receives user input for the synchronized content management system, second mapping information collected from the second client device by the client application and an indication identified by a background process run by the synchronized content management system application of a current version of the content item stored at the client application on the second client device and the second client device having second address information;
    identify, by the synchronized content management system via the indication, the second client device as having the current version of the content item, and based on the first address information and the first mapping information collected from the first client device and the second address information and the second mapping information collected from the second client device, that the second client device is connected to the local area network;
    identify a third client device having the current version of the content item, the third client device connected to the local area network and having third address information;
    determine which one of the second client device or the third client device is more likely to be reachable from the first client device based on the second address information, the third address information, and a subnet mask associated with at least one of the first client device, the second client device, or the third client device to yield a synchronization candidate; and
    send a local area network synchronization instruction to the first client device, the local area network synchronization instruction identifying the synchronization candidate, whereby the first client device can synchronize the content item from the synchronization candidate.

14. The system of claim 13, the non-transitory computer-readable storage medium storing additional instructions which, when executed by the processor, cause the processor to perform further operations comprising:
    prior to receiving the request, sending a notification from the synchronized content management system to the first client device, the notification indicating that the current version of the content item is available for synchronization.

15. The system of claim 13, the non-transitory computer-readable storage medium storing additional instructions which, when executed by the processor, cause the processor to perform further operations comprising:
    receive, from the first client device, the first address information including a first set of one or more local addresses associated with the first client device;
    receive, from the second client device, the second address information including a second set of one or more local addresses associated with the second client device;
    identify a first public address associated with the first client device;
    identify a second public address associated with the second client device; and
    update a database at the synchronized content management system based on at least one of the first set of one or more local addresses, the second set of one or more local addresses, the first public address, or the second public address.

16. The system of claim 13, the non-transitory computer-readable storage medium storing additional instructions which, when executed by the processor, cause the processor to perform further operations comprising:

when the second client device and third client device are not reachable from the first client device for synchronization, send a second synchronization instruction to synchronize the content item from the synchronized content management system.

17. The system of claim 13, the non-transitory computer-readable storage medium storing additional instructions which, when executed by the processor, cause the processor to perform further operations comprising:
compare the first address information, the second address information, and the third address information to identify a client device that shares an identical public address as the first client device but has a distinct local address from the first client device.

18. A non-transitory computer-readable storage medium comprising instructions stored thereon, which, when executed by a processor, cause the processor to:
receive, at a server of a synchronized content management system, from a client application on a first client device including a synchronized content management system application that receives user input for the synchronized content management system, first mapping information collected from the first client device by the client application and a request from the client application on the first client device to synchronize a content item from the synchronized content management system, the first client device connected to a local area network and having first address information;
receive, at the server of the synchronized content management system, from a client application on a second client device including the synchronized content management system application that receives user input for the synchronized content management system, second mapping information collected from the second client device by the client application and an indication identified by a background process run by the synchronized content management system application of a current version of the content item stored at the client application on the second client device, the second client device having second address information;
identify, by the synchronized content management system via the indication, the second client device, connected to the local area network, having the current version of the content item, based on a characteristic of the local area network, a first public address of the first client device, a first local address of the first client device, the first mapping information, the second mapping information, a second public address of the second client device, and a second local address of the second client device;
identify a third client device having the current version of the content item, the third client device connected to the local area network and having third address information;
determine which one of the second client device or the third client device is more likely to be reachable from the first client device based on the second address information, third address information, and a subnet mask associated with at least one of the first client device, the second client device, or the third client device to yield a synchronization candidate; and
sending a local area network synchronization instruction to the first client device, the local area network synchronization instruction identifying the synchronization candidate, whereby the first client device can synchronize the content item from the synchronization candidate.

19. The non-transitory computer-readable storage medium of claim 18, wherein the content item is stored on the synchronized content management system in a user account associated with the first client device.

20. The non-transitory computer-readable storage medium of claim 18, wherein address information associated with a client device includes at least one of a characteristic of the local area network, a public address of the client device, or a local address of the client device.

* * * * *